Oct. 8, 1957 P. A. HARTER 2,808,917
ELECTROMAGNETIC FRICTION DEVICE
Filed March 1, 1954
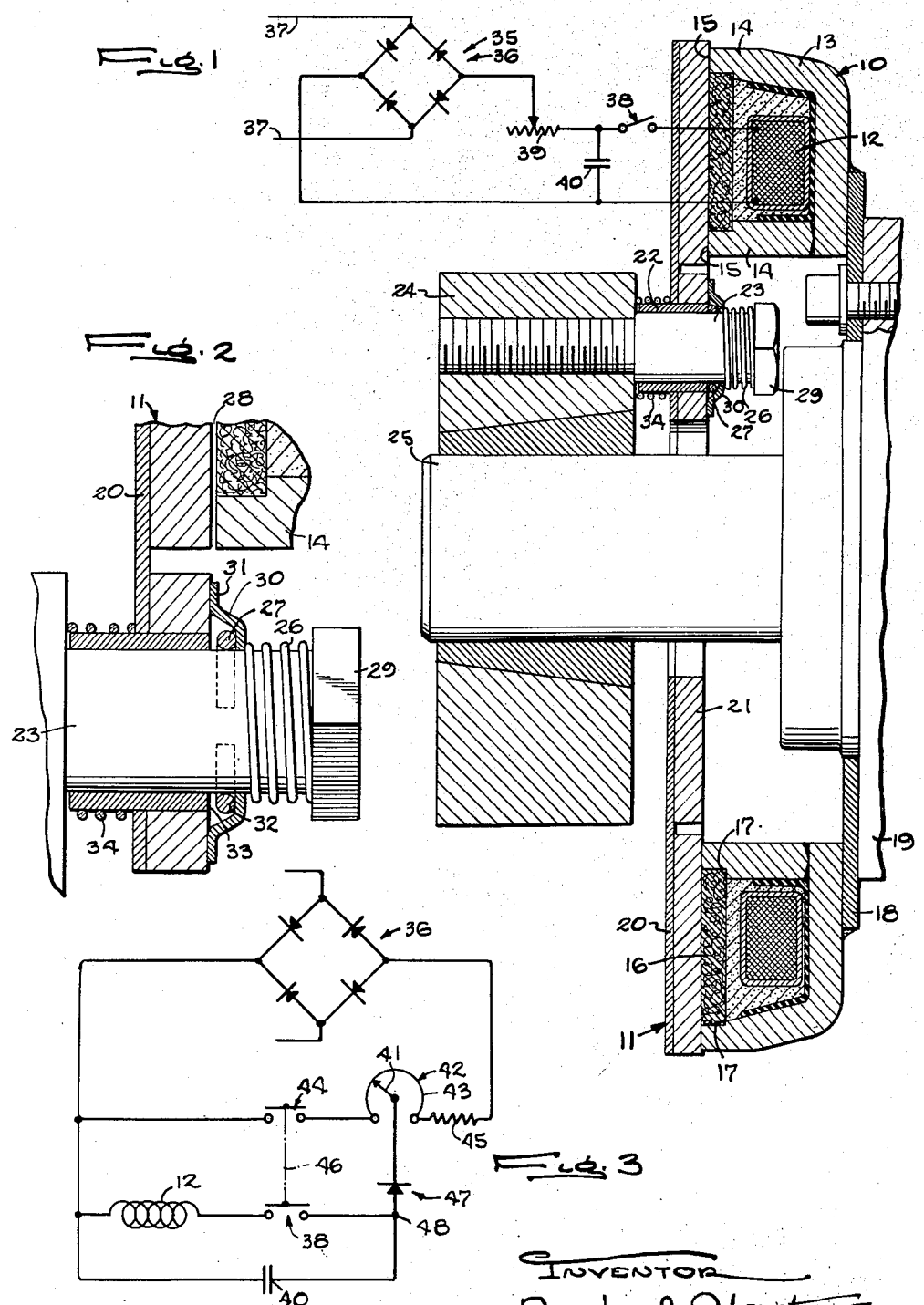
INVENTOR
Paul A. Harter

United States Patent Office 2,808,917
Patented Oct. 8, 1957

2,808,917

ELECTROMAGNETIC FRICTION DEVICE

Paul A. Harter, Beloit, Wis., assignor to Warner Electric Brake & Clutch Company, South Beloit, Ill., a corporation of Illinois Application March 1, 1954, Serial No. 413,153

2 Claims. (Cl. 192—84)

This invention relates to electromagnetic friction devices of the type having relatively rotatable magnet and armature elements which are adapted for axial gripping engagement upon energization of a winding of the magnet and which, upon deenergization of the winding, are separated by a spring action to avoid rubbing contact when the device is not producing a driving or retarding torque. More particularly, the invention is directed to a friction device and control of the type shown in Winther Patent, No. 2,395,772, in which a capacitor is utilized to provide a momentary surge of current in the winding upon closure of an energizing circuit for the latter to overcome the gap between the friction faces and draw the magnetic elements into gripping engagement without sacrificing subsequent control over the friction coupling between the elements.

The general object of the invention is to provide an improved friction device and control of the above character which enables a substantially smaller and less expensive capacitor to be used under all conditions arising in service use.

Another object is to provide a novel control circuit for a device of the above character in which the voltage source for the magnet winding is utilized more effectually in deriving the energy for producing the current surge and in which such energy is accumulated while the magnet winding is deenergized so as to be available immediately upon closure of the energizing circuit for the winding.

The invention also resides in the novel manner of correlating the characteristics of the control and the friction device so that the action of the capacitor is not affected by wear of the friction faces occurring during service use.

Other objects and advantages of the invention will become apparent from the following detailed description taken in connection with the accompanying drawings, in which Figure 1 is a diametrical sectional view and a wiring diagram of a friction device and control therefor embodying the novel features of the present invention.

Fig. 2 is an enlarged fragmentary view similar to Fig. 1 showing the parts in different positions.

Fig. 3 is a schematic wiring diagram of a modified circuit arrangement.

The invention is shown in the drawings in conjunction with an electromagnetic friction brake having relatively rotatable magnet and armature members 10 and 11 adapted to be drawn into axial gripping engagement upon energization of a multiple turn coil or winding 12. The magnet 10 comprises a rigid ring 13 of magnetic material of U-shaped cross section having radially spaced pole pieces 14 enclosing the winding 12 and terminating in axially facing pole faces 15 which are disposed in a common plane. Segments 16 of suitable friction material such as brake lining are disposed between the pole pieces 14 and seated against shoulders 17 with their outer faces flush with the pole faces 15. The magnet 10 is stationarily mounted through the medium of a plate 18 secured to a stationary support 19 and fastened, as by welding, to the closed end of the magnet ring.

The armature 11 bridges the pole faces 15 to provide a substantially closed toroidal flux circuit around the winding 12 and may comprise a series of segments or a solid ring of magnetic material as shown secured to a disk 20 projecting inwardly from the armature and welded to a collar 21. To support the armature for rotation and axial sliding movement relative to the magnet 10, bearing bushings 22 extending axially through apertures in the collar slidably receive a plurality of angularly spaced pins 23 projecting rigidly from a support 24 which is fast on a rotatable shaft 25. Release springs 26 encircling the pins yieldably urge the armature axially away from the magnet to a position which is determined by a stop 27 and in which the friction faces of the magnet and armature are out of rubbing contact with each other and are separated axially by a narrow air gap 28.

In the present instance, the gap 28 is maintained of a constant width and the stop 27 comprises a plurality of split rings of resilient material one contracted around and frictionally gripping each armature supporting pin 23 with a force greater than that exerted by the release springs 26 but less than the magnetic attractive force resulting from energization of the winding 12. The release springs act between heads 29 on the pins and the outer surfaces of dished washers 30 encircling the pins with their outer offset peripheral portions 31 bearing against the collar 21. On their inner peripheral portions, the washers provide axially facing abutments 32 which, when the washers abut the collars 21, are spaced axially from the latter and opposed abutments 33 formed by the inner ends of the bushings 22. One stop ring is disposed between each pair of abutments 32 and 33 and its axial thickness is less than the spacing of the latter by an amount equal to the desired width of the air gap 28 which may be on the order of 1/64 of an inch. To hold the armature ring 11 against drifting away from the stops 27 when the magnet is deenergized, compression springs 34 which are lighter than the release springs 26 and are coiled about the bushings 22 bear at opposite ends against the armature support 24 and the disk 20. Herein, each follow-up spring 34 is adapted to exert a force of about ½ pound as compared to the 2 to 4 pounds force of each release spring 26.

Direct current for energizing the brake winding 12 to produce flux in the toroidal circuit extending around the U-shaped magnet ring and axially back and forth between the pole faces 15 and the armature 11 is supplied by a source 35 which, in this instance, comprises a full wave rectifier 36 whose input terminals are connected to a suitable alternating current source 37 and whose output terminals are connected to the winding through a series circuit including a switch 38 and a resistor 39. The latter is variable to control the voltage applied across the winding and thus, the value of current flowing in the latter. To maintain control over the torque produced by a friction device of the above character when the latter is energized initially by closure of the switch 38, it is desirable to introduce energy to the winding 12 for producing a momentary surge of current therein sufficient to overcome the air gap 28 and the release spring action and draw the friction elements into gripping engagement and, then, to transfer the control to the variable resistor 39 which limits the current to a low value less than that required to overcome the gap but sufficient to maintain the gripping engagement of the friction elements.

In accordance with the present invention, the circuit elements controlling energization of the magnet winding 12 are arranged in a novel manner to enable the same direct current voltage source 35 which is utilized for service operation of the brake at low values of voltage and current to be utilized, while the winding is deenergized, for accumulating energy to produce the required initial current surge. By storing such energy during deenergization of the winding, the energy is available for delivery at a high voltage equal approximately to the full voltage of the source and immediately upon completion of the low voltage circuit by closure of the switch 38. At such a high voltage, a capacitor 40 of small size and, therefore, low cost may be utilized to store the energy and still deliver the same in the proper amount and at the proper rate to overcome the air gap 28 and draw the armature 11 into gripping engagement with the pole faces 15.

To carry out the invention, the capacitor 40, in the circuit shown in Fig. 1, is connected in parallel with the brake winding 12 and the switch 38 and in series with the variable current controlling resistor 39. By this arrangement, the capacitor is connected continuously in a charging circuit which includes the rectifier 36, the current varying resistor 39, and the capacitor in series and through which the capacitor becomes charged to substantially the full voltage of the source 36 when the switch 38 is open. The value of this voltage, in the present instance where a rectified source is used to provide direct current, is equal approximately to the peak value of the alternating current source 37. This energy, stored in the capacitor when the switch 38 is open, is discharged through another circuit including the capacitor, the winding, and the switch in series, the switch thus controlling both the low voltage and the capacitor discharge circuits.

In one electromagnetic friction brake and control of the above character where the voltage rating of the brake is 90 volts, approximately 25 to 30 volts must be applied to the winding to overcome the release springs 26 and an air gap 28 of approximately 1/64 of an inch between the friction faces. However, a voltage as low as 7 volts steady state is sufficient to hold the friction elements in engagement after the gap 28 has been closed. Where the voltage of the alternating current source 37 is approximately 115 volts and the steady state unidirectional voltage output of the rectifier 36 is 90 volts, the capacitor 40 will become charged to about 150 volts when the switch 38 is open as shown in Fig. 1. At this voltage, a capacitor of 30 microfarads has been found large enough to store and deliver sufficient energy at the proper rate to draw the friction elements into gripping engagement when the switch is closed.

In the operation of the improved friction brake and control described above, let it be assumed that the switch 38 is open and winding 12 is energized. Under this condition, the washers 30 are urged axially away from the magnet 10 by the release springs 26 and into abutment with the stop rings 27 and the follow-up springs 34 hold the armature collar 21 against the outer peripheries of the washers so that the armature face is spaced the desired distance from the pole faces 15 as shown in Fig. 2. The capacitor 40 becomes charged through the resistor 39 to the full voltage of the source 35 and remains so charged as long as the switch is open.

Now, when the switch 38 is closed, the stored energy in the capacitor 40 is discharged through the winding 12 and the low voltage circuit for the latter is completed. As a result of the energy discharge, the armature 11 is shifted axially against the force of the release springs 26 and into engagement with the pole faces 15 and the abutments 33 engage the stop rings 27 as shown in Fig. 1. Such energy discharge continues until the capacitor voltage reaches the value of voltage developed across the winding through the low voltage circuit. The capacitor, being connected in parallel with the winding, remains charged at this lower voltage until the switch is opened.

As the friction faces of the magnet 10 and the armature 11 wear off during engagement with each other, the stop rings 27 are shifted by the abutments 33 axially along the pins 23 and toward the magnet a distance equal to the amount of the wear. The stops are retained in the new positions through their frictional engagement with the pins so that, upon the next separation of the armature from the magnet, the air gap 28 will be of the same axial width as before the wear occurred. Since the air gap is of uniform width, the amount of energy required to draw the armature 11 across the gap and, therefore, the size of capacitor 40 needed to store this energy remain substantially the same throughout the service life of the brake.

The invention can also be carried out where the winding 12 is energized from a voltage divider circuit as shown in Fig. 3. Referring to this figure, the brake winding 12 is connected in series with the switch 38 between one output terminal of the rectifier 36 and the movable contact 41 of a potentiometer 42 having a resistance element 43 which is connected in series with a second switch 44 and a current limiting resistor 45 across the rectifier output. As in Fig. 1, the first switch 38 is connected in series with the winding 12 across the capacitor 40. The switches 38 and 44 are opened and closed in unison by a common actuator 46.

In the modified circuit arrangement of Fig. 3, the capacitor 40 will be charged to the voltage of the source 35 when the switches 38 and 44 are open as shown in Fig. 3 through a series circuit including the capacitor, a part of the potentiometer resistance element 43, and the current limiting resistor 45. Upon closure of the switches, the discharge circuit of the capacitor through the winding is closed for discharge of the stored energy through the winding. To avoid dissipation of this energy through the second switch and the adjacent part of the potentiometer resistance 43, a rectifier 47 poled to block the capacitor discharge current but to pass current for energizing the winding is interposed in series with the movable potentiometer contact 41 between the latter and the common junction 48 between the capacitor and the first switch 38. Closure of the second switch 44 completes the circuit through the potentiometer resistance 43, the resistor 45, and the rectifier 36 to apply to the winding a voltage whose value is determined by the setting of the potentiometer contact 41. The purpose of the second switch 44 is to open the energizing circuit through the potentiometer 42 and enable the capacitor to become charged to the maximum voltage of the source 35 at the time that the first switch 38 is open to deenergize the winding.

By accumulating energy in the capacitor 40 while the brake winding 12 is deenergized so that the initial surge of energy may be delivered to the winding at a voltage equal to the maximum value of the voltage of the direct current source 35, the latter is utilized more effectually than in prior controls and the capacitor may be of substantially smaller size and still insure delivery of energy in the proper amount and at the proper rate to shift the armature 11 axially the length of the air gap 28 and into engagement with the pole faces 15. By taking advantage of the wear compensating characteristic of the brake afforded by the shiftable stop 27, the capacitor 14 may be of the same small size and insure engagement of the friction elements throughout the service life of the brake in spite of wearing off of the friction surfaces thereof.

I claim as my invention:

1. The combination of, an electromagnetic friction device having relatively rotatable magnet and armature elements adapted for axial gripping engagement upon energization of a winding on the magnet element and mounted for axial sliding movement relative to and toward and away from each other, yieldable means urging said elements away from each other, a stop limiting axial separating movement of said elements under the action of said yieldable means, means operable during wearing off of the friction faces of said elements to shift said stop axially of the elements to compensate automatically for wear on the friction faces and maintain a gap of constant axial length between the faces upon deenergization of the winding, a circuit adapted when closed to energize said winding at a low voltage sufficient to maintain said elements in gripping engagement but insufficient to overcome said yieldable means and said gap to draw the elements together to close the gap, a second circuit through said winding including a capacitor for storing electrical energy for delivery at a voltage substantially higher than said low voltage and in an amount sufficient to overcome said yieldable means and said gap, means for charging said capacitor with said energy for delivery at said higher voltage while said circuits are open, and means for closing said circuits substantially simultaneously to discharge said energy through said winding to draw said elements into gripping engagement and then continue the energization of the winding at said low voltage to maintain such engagement.

2. The combination of, an electromagnetic friction device having relatively rotatable magnet and armature members adapted for axial gripping engagement upon energization of a winding on one of the members and mounted for relative axial movement toward and away from each other, yieldable means urging said members apart axially, a stop limiting the axial separating movement of said members under the action of said yieldable means, means operating automatically to shift said stop axially during wearing off of the friction faces of the members to compensate for such wear and maintain a gap of constant axial length between the faces upon deenergization of said winding, a circuit through said winding including a capacitor for storing electrical energy in an amount sufficient, when the circuit is closed, to cause current to flow in said winding at a predetermined value sufficient to overcome said gap and said yieldable means and draw said members into gripping engagement, a second circuit adapted when closed to cause current to flow in said winding at a value less than said predetermined value but sufficient to hold said members in gripping engagement, means for charging said capacitor with said energy when said circuits are open, and means for closing said circuits to discharge said energy of said capacitor through said winding to draw said members into gripping engagement and then continue the energization of the winding through said second circuit to maintain the members in such engagement.

References Cited in the file of this patent

UNITED STATES PATENTS

| | | |
|---|---|---|
| 2,290,406 | Chambers | July 21, 1942 |
| 2,395,772 | Winther | Feb. 26, 1946 |
| 2,427,751 | Snyder | Sept. 23, 1947 |
| 2,600,667 | Mason | June 17, 1952 |
| 2,664,782 | Weninger | Jan. 5, 1954 |
| 2,675,507 | Geiger | Aug. 13, 1954 |
| 2,703,164 | Binder | Mar. 1, 1955 |
| 2,718,951 | Mason | Sept. 27, 1955 |